Oct. 23, 1962 J. K. LEE 3,059,608
MUSICAL TRAINING CHAIR
Filed Dec. 23, 1959 2 Sheets-Sheet 1

Joy Koleen Lee
INVENTOR.

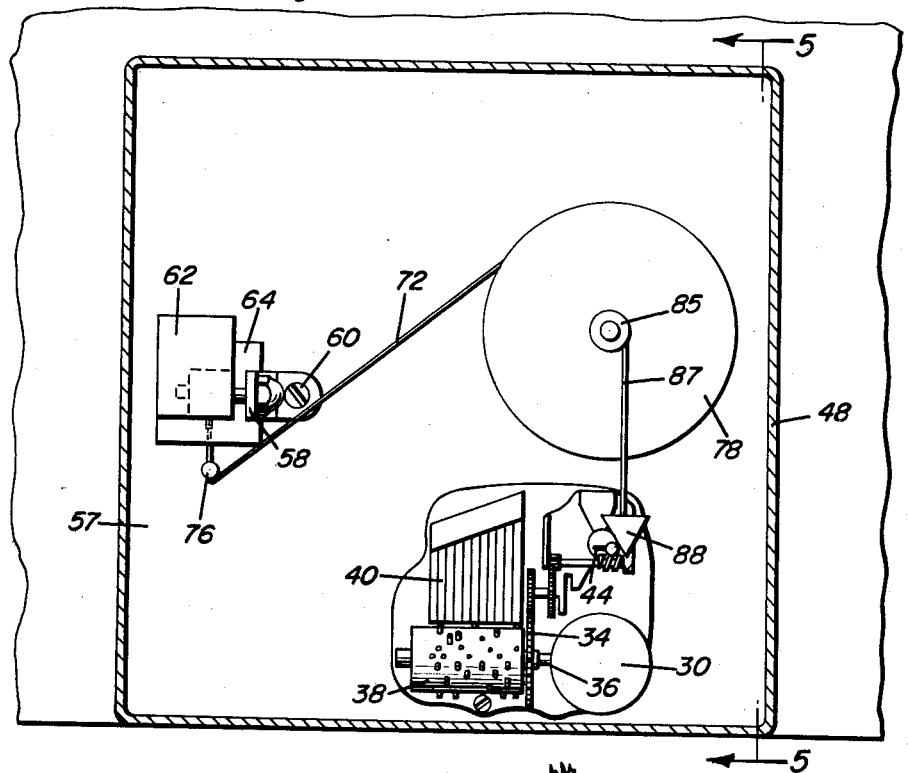
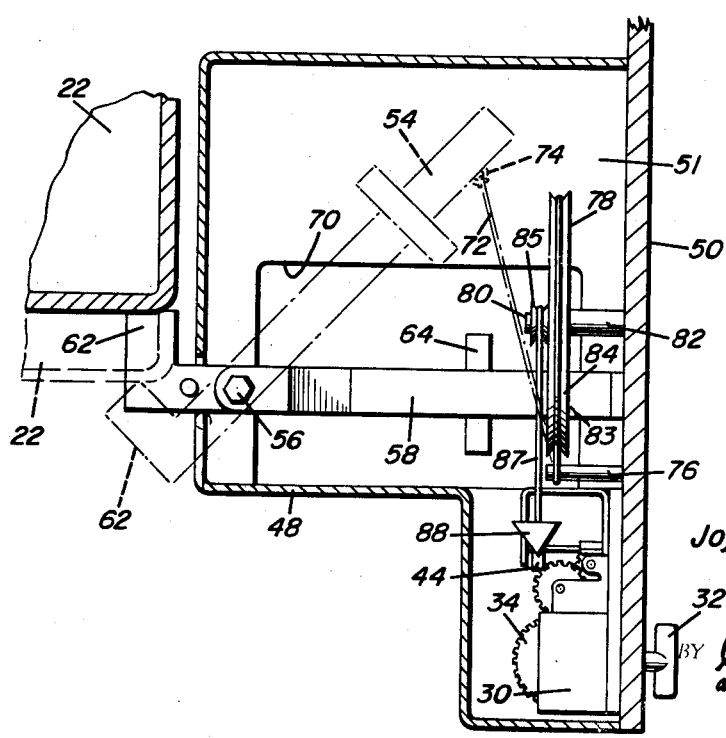

United States Patent Office 3,059,608
Patented Oct. 23, 1962

3,059,608
MUSICAL TRAINING CHAIR
Joy Koleen Lee, Auburn, Wash.
(10741 63rd St., Seattle, Wash.)
Filed Dec. 23, 1959, Ser. No. 861,688
5 Claims. (Cl. 116—67)

This invention relates to training devices and more particularly to a musical training chair.

The principal object of the invention is to provide a novel device for enticing a small child to start or improve elimination habits by forming an incentive through the agency of pleasant association.

Briefly, the invention is capable of being embodied in a musical sounding device, for instance, a music box together with a novel trip mechanism for causing the mechanism of the music box to become operative in response to the weight of body elimination. An ordinary training chair may be used as the main structural frame, however, the receptacle of the chair is supported by a counterbalance lever which is thrown out of balance when there is a deposit in the receptacle. Motion of the lever releases a stop from the music producing mechanism enabling that mechanism to function.

A further object of the invention is to provide a practical device of the nature described which is rather simple to construct and can be produced at a reasonable unit cost. It will serve a very important function in helping to train a child.

A feature of the invention is found in the stable, sensitive releasing device that will cause actuation of a suitable and adaptable mechanism at the immediate beginning and during a child's body excretion. Further, the invention is safe and reliable and provides an instantaneous response, although the response factor may be adjusted in accordance with the desires of the parent.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 4 is a sectional view taken on the line 4—4 of FIGURE 3 and on an enlarged scale.

FIGURE 5 is a sectional view taken on the line 5—5 of FIGURE 4.

Briefly summarized, the concept comprehends the adoption and use of a child's chair construction characterized by a seat having an accommodation opening, a normal horizontal load-responsive downwardly tilting receptacle, means fixed to the chair structure in a plane below the seat pivotally suspending said receptacle below and in alignment with said opening with its upper portion normally spaced below the underneath side of said seat, a trippable lever constituting a load-responsive normally balanced beam and being provided with adjustable balancing means, means supporting said lever for pivotal movement, said lever and means being offset relative to a rearward tilting portion of said receptacle, a load responsive terminal at one end of said lever upon which a minimal marginal portion of the bottom of said receptacle is supported, free-turning rotating force multiplication motion transmitting means, and flexible means associated and operatively connected with said last named means providing forces for the actuation of a sound emitting signalling device mounted cooperatively on said chair.

Figure 1:
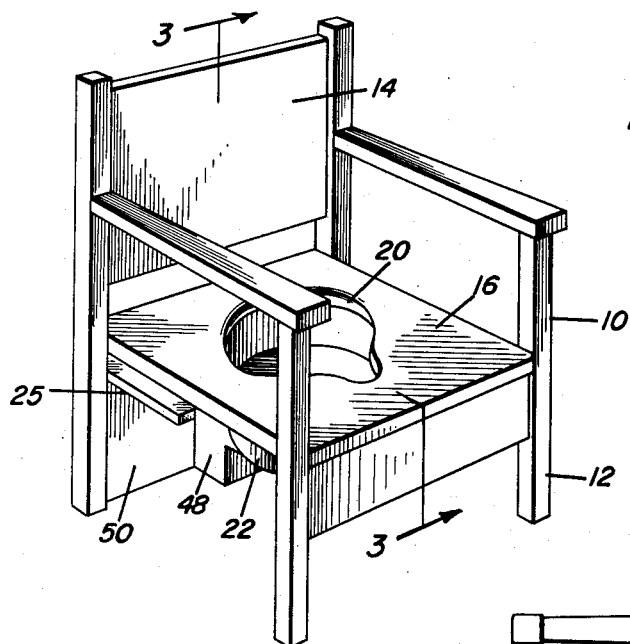
FIGURE 1 is a perspective view of a chair equipped with the features of the invention.
Figure 2:
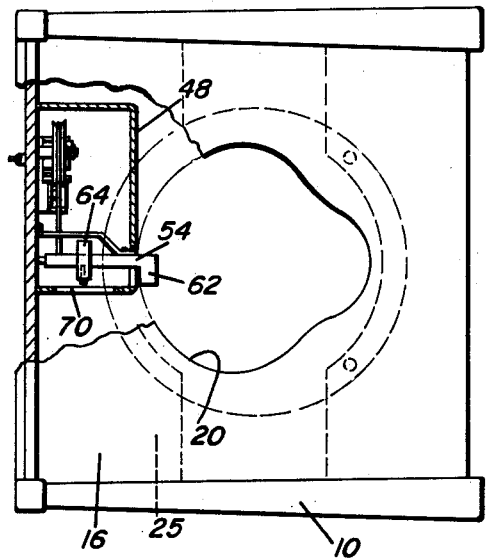
FIGURE 2 is a top view of the chair, parts broken away in section to illustrate otherwise obscure details.

In the accompanying drawings there is an illustration of a chair 10 which has legs 12, back rest 14 and a seat 16. The chair structure is conventional and may be varied considerably as to appearance and design. However, seat 16 has opening 20 beneath which receptacle 22 is disposed. Panel 24 located below seat 16 has an aperture 26 therein through which the receptacle 22 is guided. A second panel 25 is also provided. It will be noted that the panel 24 is disposed beneath the forward portion of the seat and is parallel thereto and defines a restricted space between itself and the underneath side of the seat. On the other hand, the panel 25 underlies the rear portion of the seat and is also in spaced parallelism which means of course that the outstanding rim or flange of the receptacle is restrictively operable in the spaces between the respective panels 24 and 25 and the underneath side of the seat. The forward half portion of this flange is provided with circumferentially spaced depending fulcrum points which are removably seated and fulcrumed atop the supporting and fulcruming panel 24. The stop provides restraint of the toilet receptacle to a suitable range of displacement. Low friction support for the receptacle is achieved by the supporting and fulcruming arrangement as will be evident from a consideration of FIGS. 2 and 3.

A music box mechanism 28 is illustrated to show one suitable source of pleasant sound. The music box structure is conventional and therefore, it is only diagrammatically illustrated. As is usual, the music box mechanism includes a spring housing 30 with a winding key 32 projecting therefrom, and a gear train 34 driven by an output shaft 36 from the spring mechanism. Pin supporting drum 38 is driven from shaft 36, and the pins are adapted to strike reeds 40 located adjacent to the periphery of the drum. Gear train 34 includes a number of enmeshed gears which are suitably supported for rotation and which ultimately rotate flywheel 44 at a speed considerably greater than the rotational speed of drum 38. The flywheel, being conventional, is made of a bar protruding transversely of a high speed shaft, and a flywheel 44 is the part of the mechanism which is ordinarily stopped and released in order to cause the mechanism to be stopped or set into operation.

Figure 3:
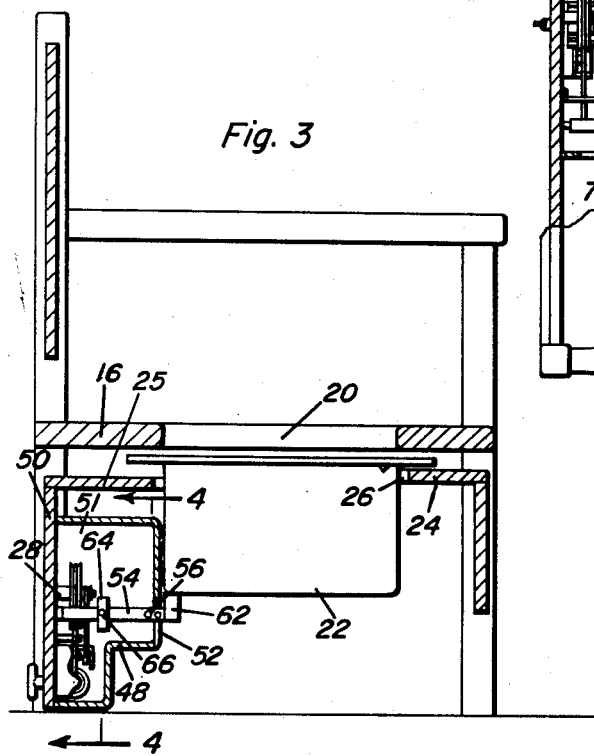
FIGURE 3 is a sectional view taken on the line 3—3 of FIGURE 1.

The music mechanism may be encased in a housing 48, although it is optional. When used, the housing will be secured to wall 50, and the music box mechanism or structure is also carried by this wall. When a housing 48 is used, slot 52 is provided to enable lever 54 to project from the interior to the exterior of the housing. Lever 54 is mounted for rotation on a pivot 56, and this is supported by mounting bracket 58 attached at one end, for instance, by bolt 60 (FIGURE 4) to a wall of housing 48. One end of the lever, i.e., the end located on the exterior of housing 48, has a rest 62 integral or rigidly secured thereto and on which a part of the lower wall of receptacle 22 is disposed. A movable counterweight 64 is mounted on lever 54 on the side of pivot 52 opposite to that side having rest 62. The weight may be held in a selected adjusted position by any type of conventional fastener such as setscrew 66 or even held in place by friction. The moment arm of the lever 54 on one side of the pivot is increased or decreased by adjusting the position of weight 64, while the moment arm on the opposite side of the pivot 56 is comparatively fixed, but will vary in magnitude in response to the addition of weight to the receptacle 22. As shown in FIGURE 3, when receptacle 22 is empty, the lever 54 is in equilibrium. To adjust the sensitivity of the lever, the weight 54 may be adjusted by access through opening 70 in housing 48, and the adjustment may be achieved without interference of the receptacle 22 since the receptacle can move up only far enough to engage the lower surface of seat 16 (FIGURE 3).

An elongate flexible member 72, for instance, a cord, is secured to the inner part of lever 54. An eye 74 secured to the lever will serve this purpose very well. The cord 72 extends over a fixed guide, such as pin 76 which is secured to wall 50, and then the cord 72 is reaved over a part of the periphery of a comparatively large pulley 78. The pulley is mounted for rotation on a spindle 80 carried by a bearing sleeve 82 that is fixed to wall 50 (FIGURE 5). The cord can be attached to the pulley in any suitable way, for instance, by having a knot 83 therein which is engageable in a slot 84 in the groove of the pulley. Comparatively small pulley 85 is fixed to one face of pulley 78 or to spindle 80, this being immaterial so long as the pulleys rotate in unison. Cord 87 is attached to pulley 85, and it has a conical weight 88 at its lower extremity. One position of the weight has the weight in contact with flywheel 44, preventing it from rotating. The weight 88 is also movable to a position at which it is vertically separated from engagement with flywheel 44, enabling the music box structure to function.

In operation, it is assumed that the lever 54 is in a state of equilibrium with the weight of the receptacle 22 on one side of the fulcrum established by pivot 56 and the counterweight 64. When the receptacle is additionally weighted, the lever 54 swings about pivot 56 as shown in dotted lines in FIGURE 5. This will cause the two pulleys 78 and 85 to rotate inasmuch as cord 72 turns pulley 78. Consequently, the weight 88, which functions as a brake or stop, is separated from flywheel 44 enabling the spring motor of the flywheel to drive the mechanism and produce a pleasant sound.

The prerequisite expedients of the over-all system may be placed in equilibrium and frictional unbalanced forces compensated such that a small incremental force added to the receptacle causing the same to ascend from its normal horizontal position will cause the music box to be brought into play. Stability is achieved by proper utilization of the aforementioned receptacle stop 25, sensitively balanced and fulcrumed receptacle 22 with its flange on the support panel 24 and the chances of premature actuation due to impact forces against the chair seat are lessened by supporting the receptacle in such a manner that the two are not in intimate contact.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A training chair comprising a child's chair construction having a seat provided with an accommodation opening, a normally horizontal load-responsive downwardly tilting receptacle, means fixed to the chair structure in a plane below the seat pivotally suspending said receptacle below and in alignment with said opening with the upper portion normally spaced below the underneath side of said seat, a trippable lever constituting a load-responsive normally balanced beam and being provided with adjustable balancing means, means supporting said lever for pivotal movement, said lever and means being offset relative to a rearward tilting portion of said receptacle, a load responsive terminal at one end of said lever upon which a minimal marginal portion of the bottom of said receptacle is supported, free-turning rotating force multiplication motion transmitting means, and flexible means associated and operatively connected with said last named means providing forces for the actuation of a sound emitting signalling device mounted cooperatively on said chair.

2. A training chair comprising a frame structure having a fixed horizontal toilet seat with an accommodation opening, horizontal receptacle supporting and fulcruming means underlying the bottom side of the seat in limited spaced parallel relation, a vertical wall below the plane of and at right angles to said supporting means, a bracket at right angles to and having an end fixed to said wall, a normally horizontal lever having a median portion pivoted on the bracket, a counterweight adjustable on said lever to one side of the pivot point, the end of the lever to the other side of the pivot point having a fixed rest to support a minimal part of the receptacle bottom, an audible signalling device fixed on said vertical wall, and an operating and connecting means between said lever and signalling device also supported on said vertical wall, said operating and connecting means embodying a pulley parallel to and rotatable on said wall and at right angles to the axis of the lever, a fixed guide and tensioning pin on the wall and located directly beneath the lever, a flexible cable one end of which is trained over and operatively associated with the pulley, the other end connected to an end of the lever adjacent said wall and a median portion cooperating slidingly with said tensioning pin, and means carried by the pulley for tripping the signalling device and setting it in operation.

3. A training chair comprising a child's chair construction having a seat provided with an accommodation opening, a normally horizontal load-responsive downwardly tilting receptacle, means fixed to the chair structure in a plane below the seat pivotally suspending said receptacle below and in alignment with said opening with the upper portion normally spaced below the underneath side of said seat, a trippable lever constituting a load-responsive normally balanced beam and being provided with adjustable balancing means, means supporting said lever for pivotal movement, said lever and means being offset relative to a rearward tilting portion of said receptacle, a load responsive terminal at one end of said lever upon which a minimal marginal portion of the bottom of said receptacle is supported, free-turning rotating force multiplication motion transmitting means and flexible means associated and operatively connected with said last-named means providing forces for the actuation of a sound emitting signalling device mounted cooperatively on said chair, said signalling device comprising a music box, said operating connection embodying a rotatably mounted pulley, a flexible cable having one end trained over and operatively associated with the pulley, a fixed tensioning pin, the other end portion of said cable being operatively associated with said pin and connected to the weighted end of said lever, said pulley being provided with an axial pulley at its central hub portion, a stop weight releasably engageable with start-stop means in said music box, and a flexible cord connected to said weight at a lower end and having an upper end thereof operatively connected with and windable on said second named pulley.

4. A training chair comprising a frame structure embodying a fixed horizontal toilet seat with an accommodation opening, a receptacle support panel fixed in a horizontal plane beneath a forward portion of said seat and parallel to and in close proximity to the underneath side of the seat, a fixed vertical wall in a plane below a rearward portion of said seat and disposed at right angles to the seat and panel, a second panel below said seat and connected with said wall at right angles thereto and having a horizontal plane below the plane of the first named panel and constituting a receptacle limit stop, a bracket at right angles to and having an end fixed to said vertical wall, said bracket being disposed in a plane below said limit stop, a normally horizontal lever having a median portion alongside and pivoted on said bracket, a counterweight adjustable on said lever, one end of said lever being adapted to engage and support a minimal portion of a tiltable part of a receptacle, a music box fixed on said vertical wall, and operating and connecting means between the weighted end of said lever and said music box, said means being wholly supported on said wall, said operating means embodying a pulley parallel to and rotatable on said vertical wall and disposed in a plane at right angles to the lengthwise axis of the lever, a fixed guide and tensioning pin on the wall in a plane below the plane of the lever, a flexible cable having one end trained over and cooperatively associated with the pulley, the other end connected to the weighted end portion of said lever and a median portion cooperating slidingly with said tensioning pin, and a flexibly supported weight carried by the hub portion of said pulley and releasably cooperable with start-stop means embodied in said music box.

5. The structure defined in claim 4 and in combination, a receptacle having an upstanding wall provided with a horizontal outstanding flange, said flange being confined for operation in limited existing spaces between the aforementioned panels and underneath side of said seat, said flange being provided with circumferentially spaced fulcruming elements fulcrumed removably atop said first named panel, the bottom of said receptacle having a minimal portion thereof resting on an underlying tiltable end portion of said lever.

References Cited in the file of this patent

UNITED STATES PATENTS

| | | |
|---|---|---|
| 2,435,105 | Solomon | Jan. 27, 1948 |
| 2,535,704 | Snyder | Dec. 26, 1950 |
| 2,788,764 | Headlee | Apr. 16, 1957 |
| 2,802,444 | Gilmour | Aug. 13, 1957 |

FOREIGN PATENTS

| | | |
|---|---|---|
| 1,028,696 | France | May 27, 1953 |